United States Patent
Tavildar et al.

(10) Patent No.: US 10,419,176 B2
(45) Date of Patent: Sep. 17, 2019

(54) METHODS AND APPARATUS FOR TRANSMITTING IN-BAND CONTROL INFORMATION IN WIRELESS COMMUNICATION

(71) Applicant: QUALCOMM Incorporated, San Diego, CA (US)

(72) Inventors: Saurabha Tavildar, Jersey City, NJ (US); Thomas Richardson, South Orange, NJ (US); Shrinivas Kudekar, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 393 days.

(21) Appl. No.: 15/171,941

(22) Filed: Jun. 2, 2016

(65) Prior Publication Data

US 2017/0141895 A1 May 18, 2017

Related U.S. Application Data

(60) Provisional application No. 62/254,557, filed on Nov. 12, 2015.

(51) Int. Cl.
| | |
|---|---|
| *H04L 5/00* | (2006.01) |
| *H04W 72/04* | (2009.01) |
| *H04L 1/00* | (2006.01) |
| *H04L 1/16* | (2006.01) |
| *H04L 1/18* | (2006.01) |

(52) U.S. Cl.
CPC .......... *H04L 5/0048* (2013.01); *H04L 1/0078* (2013.01); *H04L 5/0053* (2013.01); *H04W 72/042* (2013.01); *H04W 72/0413* (2013.01); *H04L 1/1671* (2013.01); *H04L 1/1887* (2013.01)

(58) Field of Classification Search
CPC ... H04L 5/0048; H04L 1/0078; H04L 5/0053; H04W 72/0413; H04W 72/042
See application file for complete search history.

(56) References Cited

U.S. PATENT DOCUMENTS

| | | |
|---|---|---|
| 7,873,010 B2 | 1/2011 | Love et al. |
| 8,514,796 B2 | 8/2013 | Kowalski et al. |
| 8,576,955 B2 | 11/2013 | Challa et al. |
| 9,119,189 B2 | 8/2015 | Grant et al. |

(Continued)

FOREIGN PATENT DOCUMENTS

| | | |
|---|---|---|
| WO | WO-2009020983 A1 | 2/2009 |

OTHER PUBLICATIONS

International Search Report and Written Opinion—PCT/US2016/060695—ISA/EPO—dated Jan. 20, 2017.

*Primary Examiner* — Oussama Roudani
(74) *Attorney, Agent, or Firm* — Linda G. Gunderson; Loza & Loza LLP

(57) ABSTRACT

Various aspects of the present disclosure provide for methods, apparatus, and computer software for transmitting in-band control information in a wireless communication channel. A control and data information coding scheme is utilized to reduce the block error rate (BLER) of in-band control information in various scenarios. A subframe carries coded control information, coded data information, and coded control-data information for reducing the BLER of the in-band control information. The coded control information and coded data information are mix-coded to generate coded control-data information.

12 Claims, 18 Drawing Sheets

(56) References Cited

U.S. PATENT DOCUMENTS

| | | |
|---|---|---|
| 9,125,192 B2 | 9/2015 | Cheon et al. |
| 9,237,561 B2 | 1/2016 | Han et al. |
| 2010/0098012 A1 | 4/2010 | Bala et al. |
| 2011/0080903 A1* | 4/2011 | Yin ................... H04L 1/0067 370/345 |
| 2011/0249643 A1* | 10/2011 | Barbieri ............ H04L 1/0026 370/329 |

* cited by examiner

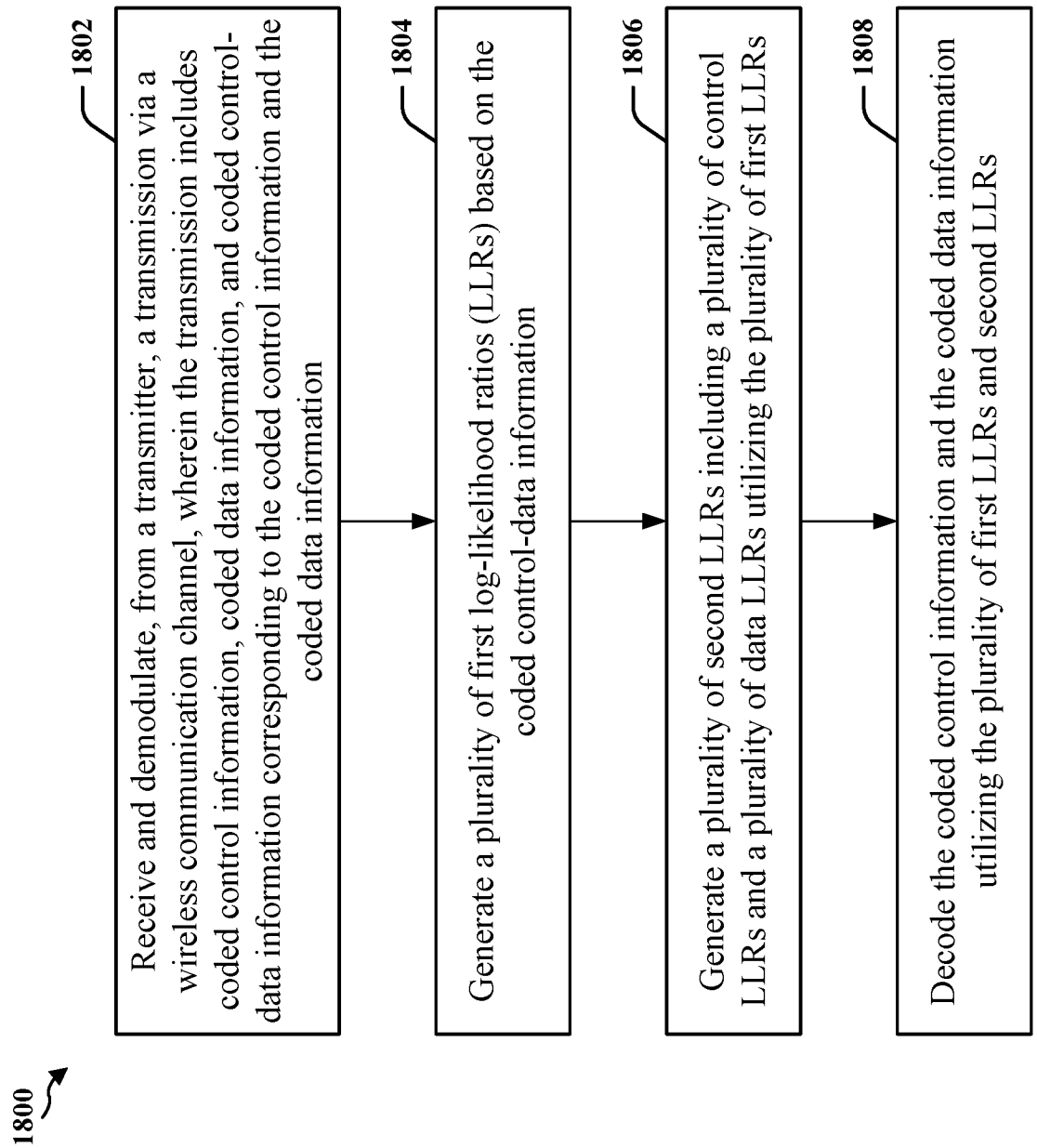

METHODS AND APPARATUS FOR TRANSMITTING IN-BAND CONTROL INFORMATION IN WIRELESS COMMUNICATION

PRIORITY CLAIM

This application claims priority to and the benefit of provisional patent application No. 62/254,557 filed in the United States Patent and Trademark Office on Nov. 12, 2015, the entire content of which is incorporated herein by reference as if fully set forth below in its entirety and for all applicable purposes.

TECHNICAL FIELD

The technology discussed below relates generally to wireless communication systems, and more particularly, to transmitting in-band control information in wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

Long Term Evolution (LTE) is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology.

A wireless communication system may include a number of scheduling entities (e.g., base stations) that can support communication for a number of subordinate entities (e.g., user equipment). A subordinate entity may transmit various control information to the scheduling entity via one or more uplink (UL) channels. For example, the subordinate entity may transmit various Uplink Control Information (UCI) over a Physical Uplink Control Channel (PUCCH) and a Physical Uplink Shared Channel (PUSCH). The UCI may include a scheduling request (SR), an acknowledgement/non-acknowledgement (ACK/NACK) signal for hybrid automatic retransmission request (HARQ), a channel quality indicator (CQI), a precoding matrix indicator (PMI), a rank indicator (RI), etc. The PUSCH may carry both user information and the UCI. When both control information and data are transmitted using the same channel, such control information is called in-band control information.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure provide for methods, apparatus, and computer software for transmitting in-band control information in a wireless communication channel.

One aspect of the disclosure provides a method of transmitting in-band control information in a wireless communication network. The method may be operable at a subordinate entity to separately encode control information and data information to generate coded control information and coded data information for a wireless communication channel. The method generates coded control-data (C-D) information from the coded control information and the coded data information. The method transmits, to the wireless communication channel, the coded control information, the coded data information, and the coded control-data information.

One aspect of the disclosure provides a method of receiving in-band control information in a wireless communication network. The method may be operable at a scheduling entity to receive and demodulate a transmission via a wireless communication channel, wherein the transmission includes coded control information, coded data information, and coded control-data information corresponding to the coded control information and the coded data information. The method generates a plurality of first log-likelihood ratios (LLRs) based on the coded control-data information. The method generates a plurality of second LLRs including a plurality of control LLRs and a plurality of data LLRs utilizing the plurality of first LLRs. The method decodes the coded control information and the coded data information utilizing the plurality of first LLRs and second LLRs.

One aspect of the disclosure provides an apparatus for wireless communication. The apparatus may be a subordinate entity that includes a processor, a transceiver communicatively coupled to the processor, and a memory stored with executable code and communicatively coupled to the processor. The processor is configured by the executable code to perform various operations. The processor is configured to separately encode control information and data information to generate coded control information and coded data information for a wireless communication channel. The processor is configured to generate coded control-data information from the coded control information and the coded data information. The processor is configured to transmit, to the wireless communication channel utilizing the transceiver, the coded control information, the coded data information, and the coded control-data information.

One aspect of the disclosure provides an apparatus for wireless communication. The apparatus may be a scheduling entity that includes a processor, a transceiver communicatively coupled to the processor, and a memory stored with executable code and communicatively coupled to the processor. The processor is configured by the executable code to perform various operations. The processor is configured to receive and demodulate a transmission via a wireless communication channel, wherein the transmission includes coded control information, coded data information, and coded control-data information corresponding to the coded control information and the coded data information. The processor is configured to generate a plurality of first log-likelihood ratios (LLRs) based on the coded control-data information. The processor is configured to generate a plurality of second LLRs including a plurality of control LLRs and a plurality of data LLRs utilizing the plurality of first LLRs. The processor is configured to decode the coded control information and the coded data information utilizing the plurality of first LLRs and second LLRs.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 18 is a flowchart illustrating an in-band control information reception method in a wireless communication network, in accordance with an aspect of the disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Figure 1:
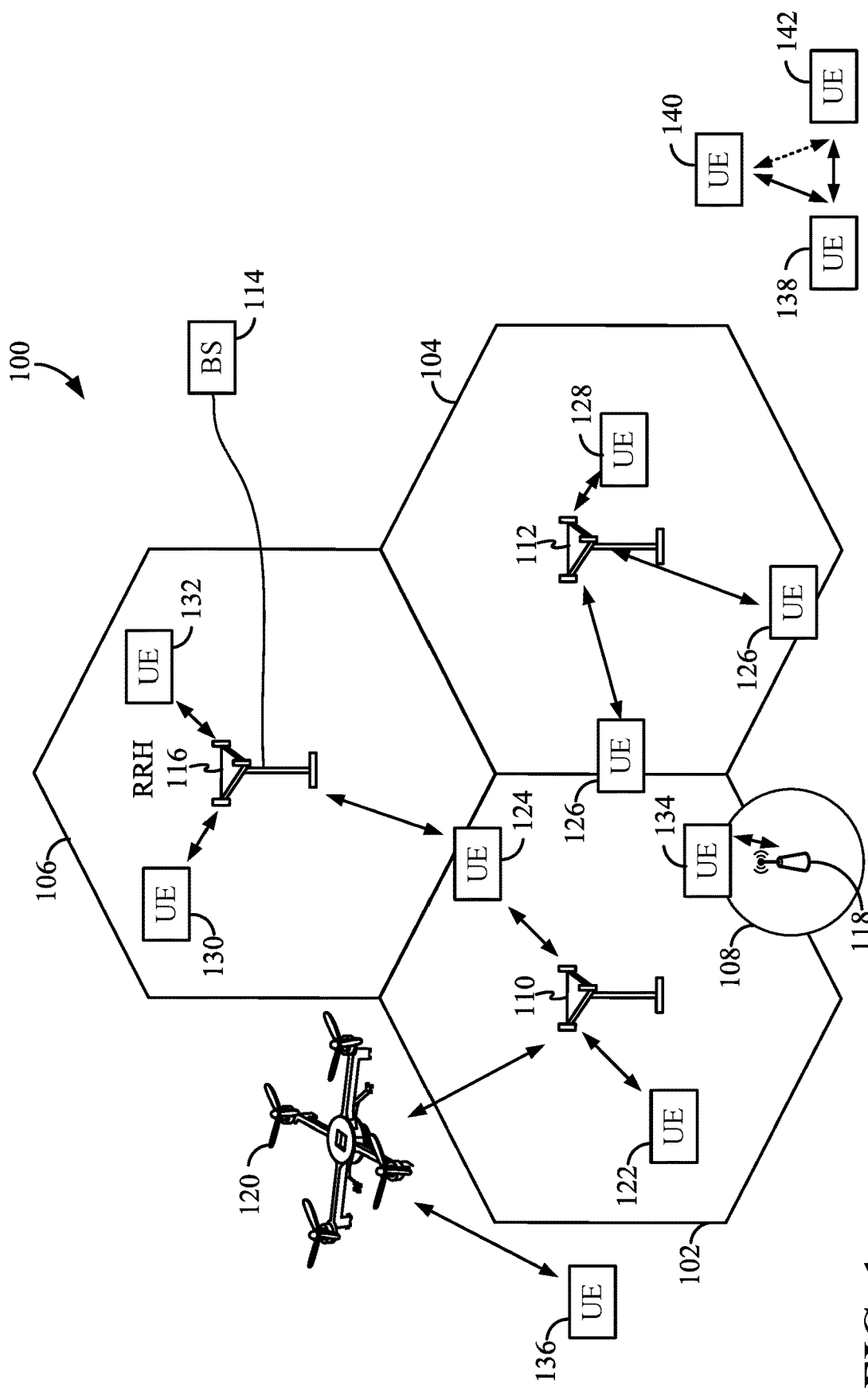
FIG. 1 is a diagram illustrating an example of an access network in accordance with an aspect of the disclosure.

In FIG. 1, two high-power base stations 110 and 112 are shown in cells 102 and 104; and a third high-power base station 114 is shown controlling a remote radio head (RRH) 116 in cell 106. In this example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In some examples, the base stations may be interconnected to one another and/or to one or more other base stations or network nodes (not shown) in the access network 100 through various types of backhaul interfaces such as a direct physical connection, a virtual network, or the like using any suitable transport network.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Within the present document, a "mobile" apparatus need not necessarily have a capability to move, and may be stationary. Some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, the quadcopter 120 may be configured to function as a UE. For example, the quadcopter 120 may operate within cell 102 by communicating with base station 110.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), or other suitable multiplexing schemes.

Within the access network 100, during a call with a scheduling entity, or at any other time, a UE may monitor various parameters of the signal from its serving cell as well as various parameters of neighboring cells. Further, depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). For example, UE 138 is illustrated communicating with UEs 140 and 142. In this example, the UE 138 is functioning as a scheduling entity, and UEs 140 and 142 utilize resources scheduled by the UE 138 for wireless communication. A UE may function as a scheduling entity in a peer-to-peer (P2P) network, and/or in a mesh network. In a mesh network example, UEs 140 and 142 may optionally communicate directly with one another in addition to communicating with the scheduling entity (e.g., a UE 138).

Figure 2:
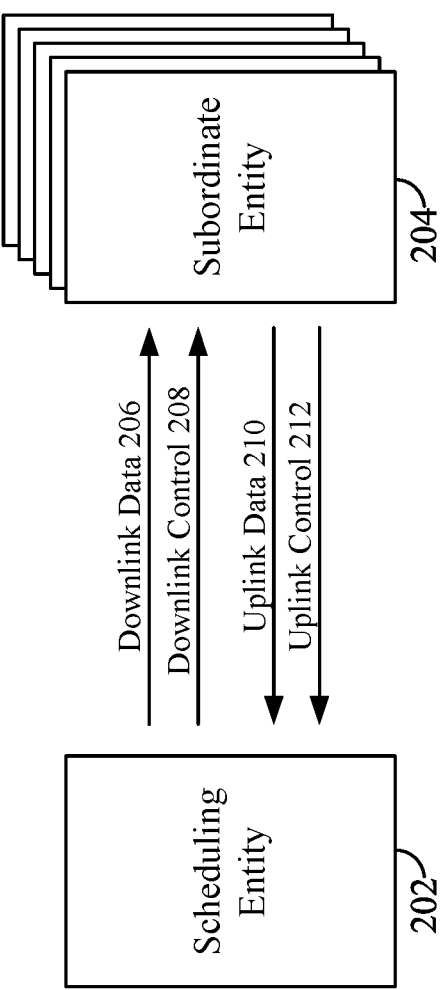
FIG. 2 is a block diagram illustrating an exemplary scheduling entity in wireless communication with a plurality of subordinate entities, in accordance with an aspect of the disclosure.

Thus, in a wireless communication network with a scheduled access to time-frequency resources and having a cellular configuration, a P2P configuration, and a mesh configuration, a scheduling entity and one or more subordinate entities may communicate utilizing the scheduled resources. Referring now to FIG. 2, a block diagram illustrates a scheduling entity 202 and a plurality of subordinate entities 204. Here, the scheduling entity 202 may correspond to the base stations 110, 112, 114, and 118 of FIG. 1. In additional examples, the scheduling entity 202 may correspond to the UE 138, the quadcopter 120, or any other suitable node in the access network 100. Similarly, in various examples, the subordinate entity 204 may correspond to the UE 122, 124, 126, 128, 130, 132, 134, 136, 138, 140, and 142, or any other suitable node in the access network 100 of FIG. 1.

The modulation and multiple access scheme employed between scheduling entities and subordinate entities by the access network 100 may vary depending on the particular telecommunications standard being deployed. In applications that use fourth generation (4G) long-term evolution (LTE) standards, orthogonal frequency division multiplexing (OFDM) is used on the downlink (DL) and single carrier frequency divisional multiple access (SC-FDMA) is used on the uplink (UL) to support both frequency division duplexing (FDD) and time division duplexing (TDD). As those skilled in the art will readily appreciate from the detailed description to follow, at least some of the various concepts presented herein are well suited for LTE applications. However, these concepts may be readily extended to other telecommunication standards employing other modulation and multiple access techniques. By way of example, at least some of these concepts may be extended to Evolution-Data Optimized (EV-DO). EV-DO is an air interface standard promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; IEEE 802.11 (Wi-Fi), IEEE 802.16 (WiMAX), IEEE 802.20, and Flash-OFDM employing OFDMA. UTRA, UMTS, LTE and GSM are described in documents from the 3GPP organization. The actual wireless communication standard and the multiple access technology employed will depend on the specific application and the overall design constraints imposed on the system.

As illustrated in FIG. 2, the scheduling entity 202 may broadcast data 206 to one or more subordinate entities 204 (the data may be referred to as downlink data). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more subordinate entities to the scheduling entity 202. Another way to describe the system may be to use the term broadcast channel multiplexing. In accordance with aspects of the present disclosure, the term uplink may refer to a point-to-point transmission originating at a subordinate entity 204. Broadly, the subordinate entity 204 is a node or device that receives scheduling control information, including but not limited to scheduling grants, synchronization or timing information, or other control information from another entity in the wireless communication network such as the scheduling entity 202.

The scheduling entity 202 may broadcast a control channel 208 to one or more subordinate entities 204. Uplink data 210 and/or downlink data 206 may be transmitted using a transmission time interval (TTI). Here, a TTI may correspond to an encapsulated set or packet of information capable of being independently decoded. In various examples, TTIs may correspond to frames, subframes, data blocks, time slots, or other suitable groupings of bits for transmission.

Furthermore, the subordinate entities 204 may transmit uplink control information 212 to the scheduling entity 202. Uplink control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit in the downlink control channel 208 information that may schedule the TTI for uplink packets. In a further example, the uplink control channel 212 may include hybrid automatic repeat request (HARQ) feedback transmissions, such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

The channels illustrated in FIG. 2 are not necessarily all of the channels that may be utilized between a scheduling entity 202 and subordinate entities 204, and those of ordinary skill in the art will recognize that other channels may be utilized in addition to those illustrated, such as other data, control, and feedback channels.

In accordance with aspects of the present disclosure, the term uplink may refer to a point-to-point transmission originating at a subordinate entity 204. Broadly, the subordinate entity 204 is a node or device that receives scheduling control information, including but not limited to scheduling grants, synchronization or timing information, or other control information from another entity in the wireless communication network such as the scheduling entity 202. A subordinate entity may be, or may reside within, a base station, a network node, a UE, an access terminal, or any suitable node in a wireless communication network.

A subordinate entity may transmit in-band control information to a scheduling entity via an uplink (UL) channel. In-band control information refers to control information that is transmitted together with data information in the same channel using certain multiplexing schemes. In one example, the UL channel may be a Physical Uplink Shared Channel (PUSCH) that may carry data information only or both control information (i.e., in-band control) and data information.

A ratio of the number of erroneous data blocks to the total number of data blocks received on a receiver is known as its Block Error Rate (BLER). In general, the control information has a low BLER target relative to the data information. This may be achieved by allocating energy from the data information to the control information and/or coding the control information at a lower rate than the coding rate utilized for the data information. The data information may employ re-transmissions and thus can tolerate a higher BLER, relative to the control information, for the first transmission. For example, the control information and the first transmission of data information may have BLERs of 1% and 10%, respectively.

Aspects of the present disclosure provide a control and data information coding scheme that may reduce the BLER of the in-band control information in various scenarios. While the described coding scheme is illustrated with the uplink channels (e.g., PUSCH) using Long Term Evolution (LTE) network terminology, the concept and features of the present disclosure may be extended to other wireless communication technologies for both uplink and downlink channels.

Figure 7:
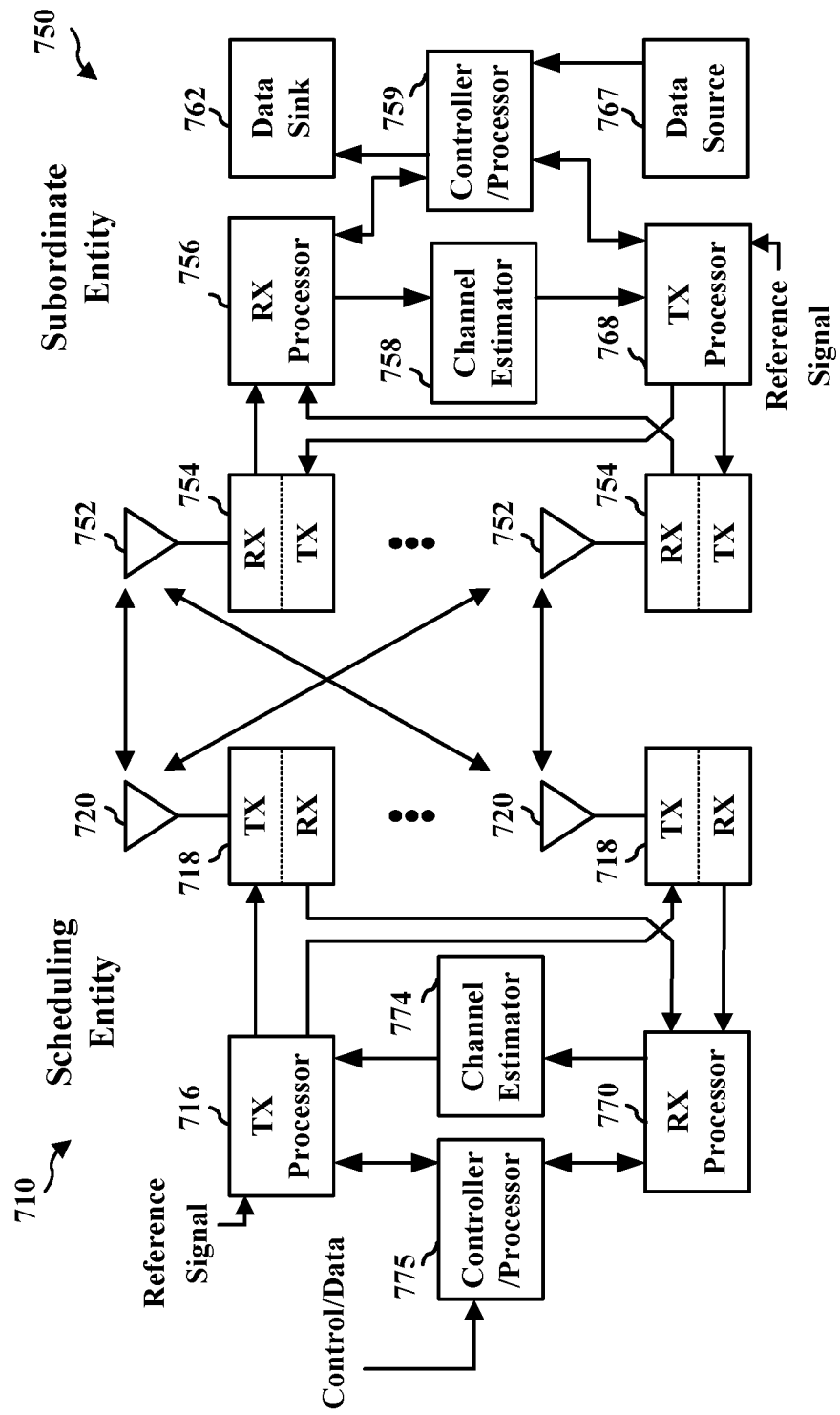
FIG. 7 is a diagram illustrating an example of a scheduling entity and a subordinate entity in an access network.

As illustrated in FIG. 7 and described further below, the scheduling entity 202 (or 710) may have multiple antennas supporting multiple-input multiple-output (MIMO) technology. The use of MIMO technology enables the scheduling entity 202 to exploit the spatial domain to support spatial multiplexing, beamforming, and transmit diversity.

Spatial multiplexing may be used to transmit different streams of data simultaneously on the same frequency. The data steams may be transmitted to a single subordinate entity 204 to increase the data rate or to multiple subordinate entities 204 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the subordinate entities 204 with different spatial signatures, which enables each of the subordinate entities 204 to recover the one or more data streams destined for that subordinate entity 204. On the uplink, each subordinate entity 204 may transmit a spatially precoded data stream, which enables the scheduling entity 202 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides orthogonality, which enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a discrete Fourier transform (DFT)-spread OFDM signal to compensate for high peak-to-average power ratio (PAPR). Of course, those of ordinary skill in the art will understand that these examples are exemplary in nature, and the claims appended below may be applied to any suitable multiplexing and modulation scheme.

Figure 3:
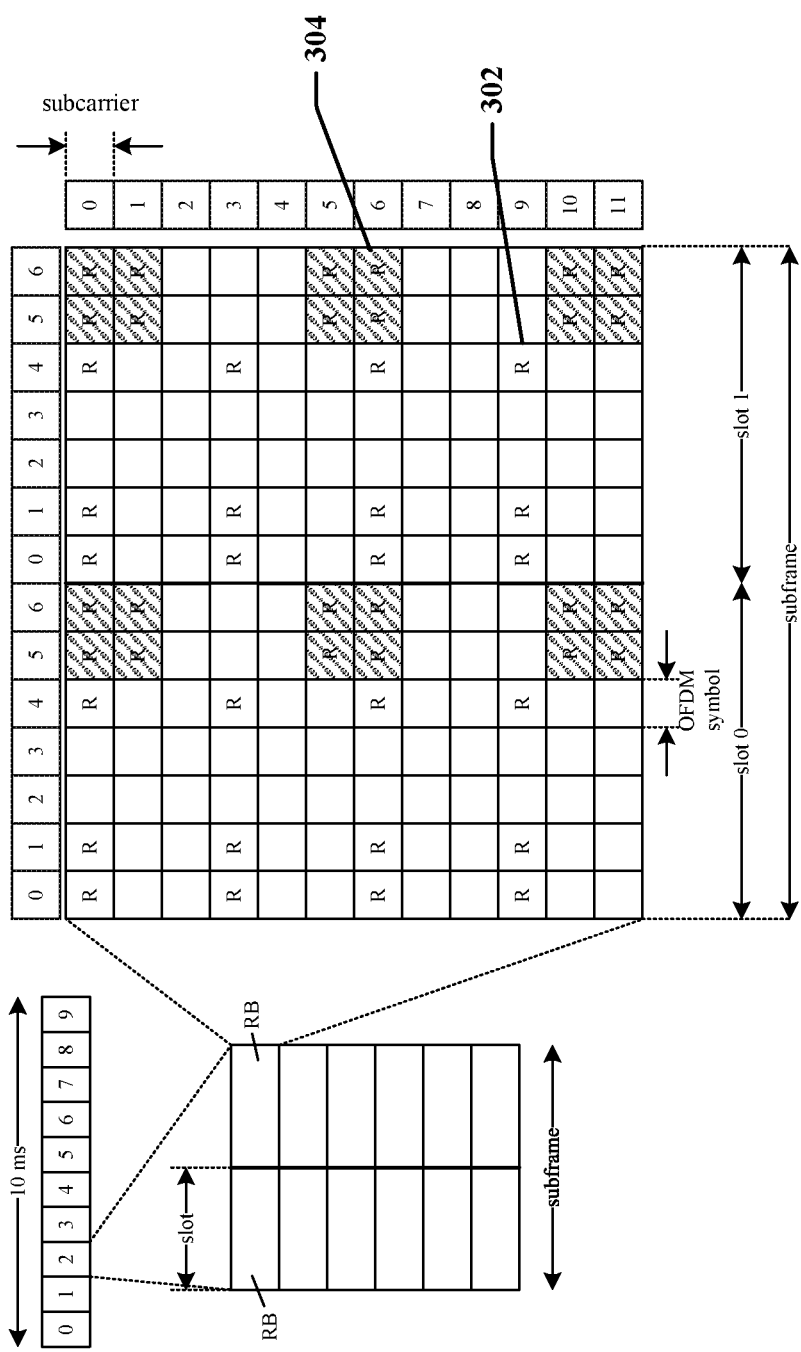
FIG. 3 is a diagram illustrating an example of a downlink (DL) frame structure for use in an access network.

Various frame structures may be used to support the downlink (DL) and uplink (UL) transmissions. An example of a DL frame structure will now be presented with reference to FIG. 3. However, as those skilled in the art will readily appreciate, the frame structure for any particular application may be different depending on any number of factors. In this example, a frame (e.g., 10 milliseconds (ms) frame) may be divided into 10 equally sized sub-frames. Each sub-frame includes two consecutive time slots.

A resource grid may be used to represent two time slots, each time slot including a resource block. The resource grid is divided into multiple resource elements. In this example, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a subordinate entity (e.g., UE) receives and the higher the modulation scheme, the higher the data rate for the UE.

Figure 4:
FIG. 4 is a diagram illustrating an example of an uplink (UL) format for use in an access network.

An example of a UL frame structure 400 will now be presented with reference to FIG. 4. This figure shows an exemplary format for the UL that may be used in LTE. The available resource blocks for the UL may be partitioned into a data section and a control section. The control section may be formed at the two edges of the system bandwidth and may have a configurable size. The resource blocks in the control section may be assigned to subordinate entities (e.g., UEs) for transmission of control information. The data section may include all resource blocks not included in the control section. The design in FIG. 4 results in the data section including contiguous subcarriers, which may allow a single subordinate entity (e.g., UE) to be assigned all of the contiguous subcarriers in the data section.

A subordinate entity may be assigned resource blocks 410a, 410b in the control section to transmit control information to a scheduling entity (e.g., a base station). The subordinate entity may also be assigned resource blocks 420a, 420b in the data section to transmit data information (user payload) to the scheduling entity. The subordinate entity may transmit control information in a physical uplink control channel (PUCCH) on the assigned resource blocks in the control section. The subordinate entity may transmit only data or both data and control information in a physical uplink shared channel (PUSCH) on the assigned resource blocks in the data section. A UL transmission may span both slots of a subframe and may hop across frequency as shown in FIG. 4. As shown in FIG. 4, a set of resource blocks (RBs) may be used to perform initial system access and achieve UL synchronization in a physical random access channel (PRACH) 430.

Figure 5:
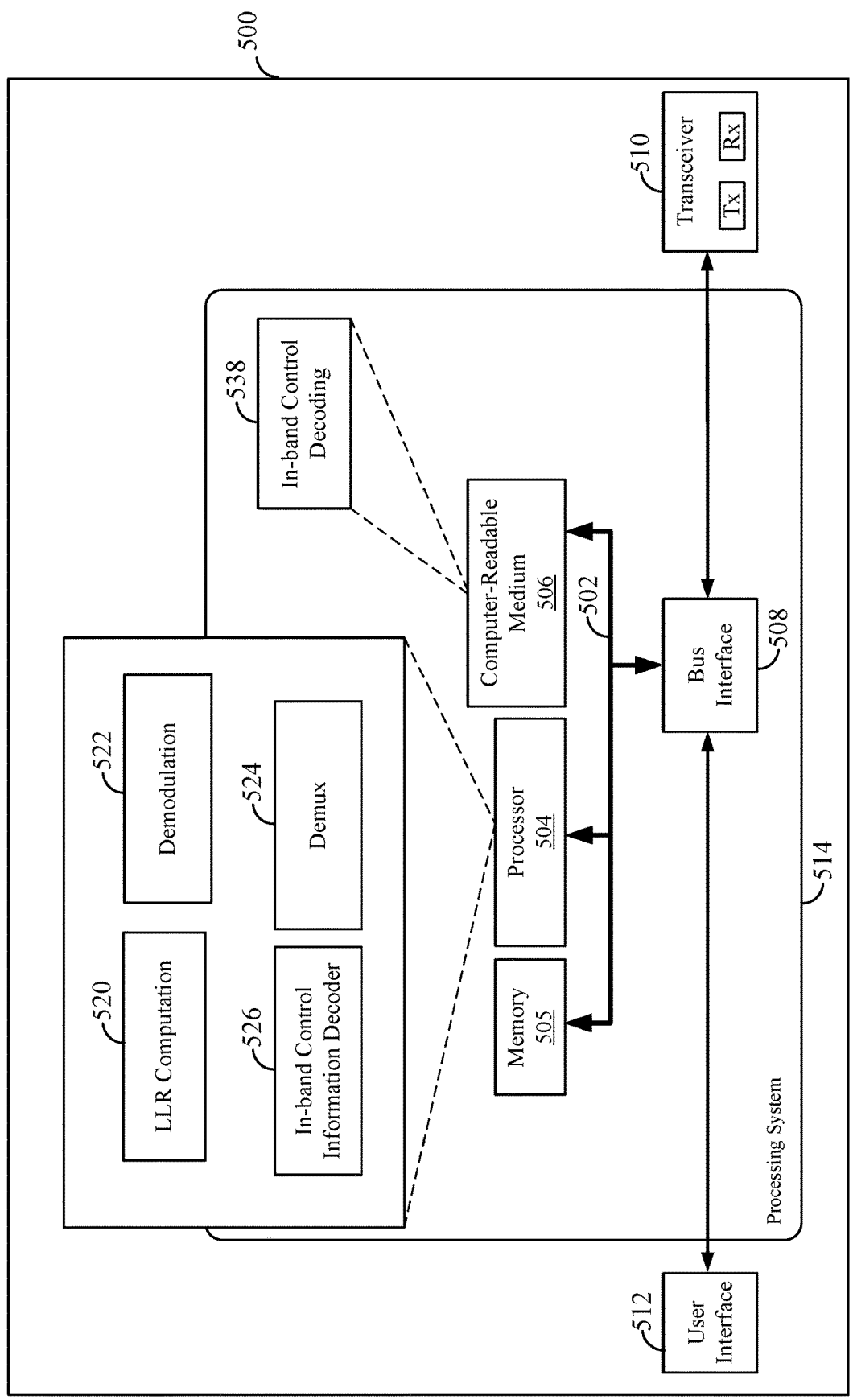
FIG. 5 is a diagram illustrating an example of a hardware implementation for a scheduling entity in accordance with an aspect of the disclosure.

FIG. 5 is a conceptual diagram illustrating an example of a hardware implementation for a scheduling entity 500 employing a processing system 514. In accordance with various aspects of the disclosure, an element, or any portion of an element, or any combination of elements may be implemented with a processing system 514 that includes one or more processors 504. For example, the scheduling entity 500 may be any of the scheduling entities, base station (BS), or any other suitable network node, as illustrated in FIGS. 1, 2, and/or 7. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 504, as utilized in a scheduling entity 500, may be used to implement any one or more of the processes described in FIGS. 14-16 and 18 of the present disclosure.

In this example, the processing system 514 may be implemented with a bus architecture, represented generally by the bus 502. The bus 502 may include any number of interconnecting buses and bridges depending on the specific application of the processing system 514 and the overall design constraints. The bus 502 links together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and one or more transceivers 510. The transceiver 510 provides a communication interface or means for communicating with various other apparatus over a transmission medium. In various examples, the transceiver 510 may include one or more antennas, and in multi-antenna examples, may be enabled to determine an angle from which a received signal arrives, or for beamforming of transmitted signals. The transceiver 510 may include various sub-components configured to enable wireless communication, including but not limited to one or more power amplifiers, a transmitter, a receiver, filters, oscillators, etc. Further, depending upon the nature of the apparatus, a user interface 512 (e.g., keypad, display, speaker, microphone, joystick, etc.) may also be provided.

In one aspect of the disclosure, the processor 504 includes an LLR computing block 520, a demodulation block 522, a demultiplexing block 524, and an in-band control information decoding block 526. The LLR computing block 520 may be configured to compute or generate LLRs of received OFDM symbols using known techniques in the art. The demodulation block 522 may be configured to perform various functions to convert received time-domain OFDM symbols into single carrier symbols. For example, the demodulation block 522 may be configured to perform cyclic prefix removal, discrete Fourier transfer (DFT), frequency domain equalization, and inverse discrete Fourier transform (IDFT).

Figure 14:
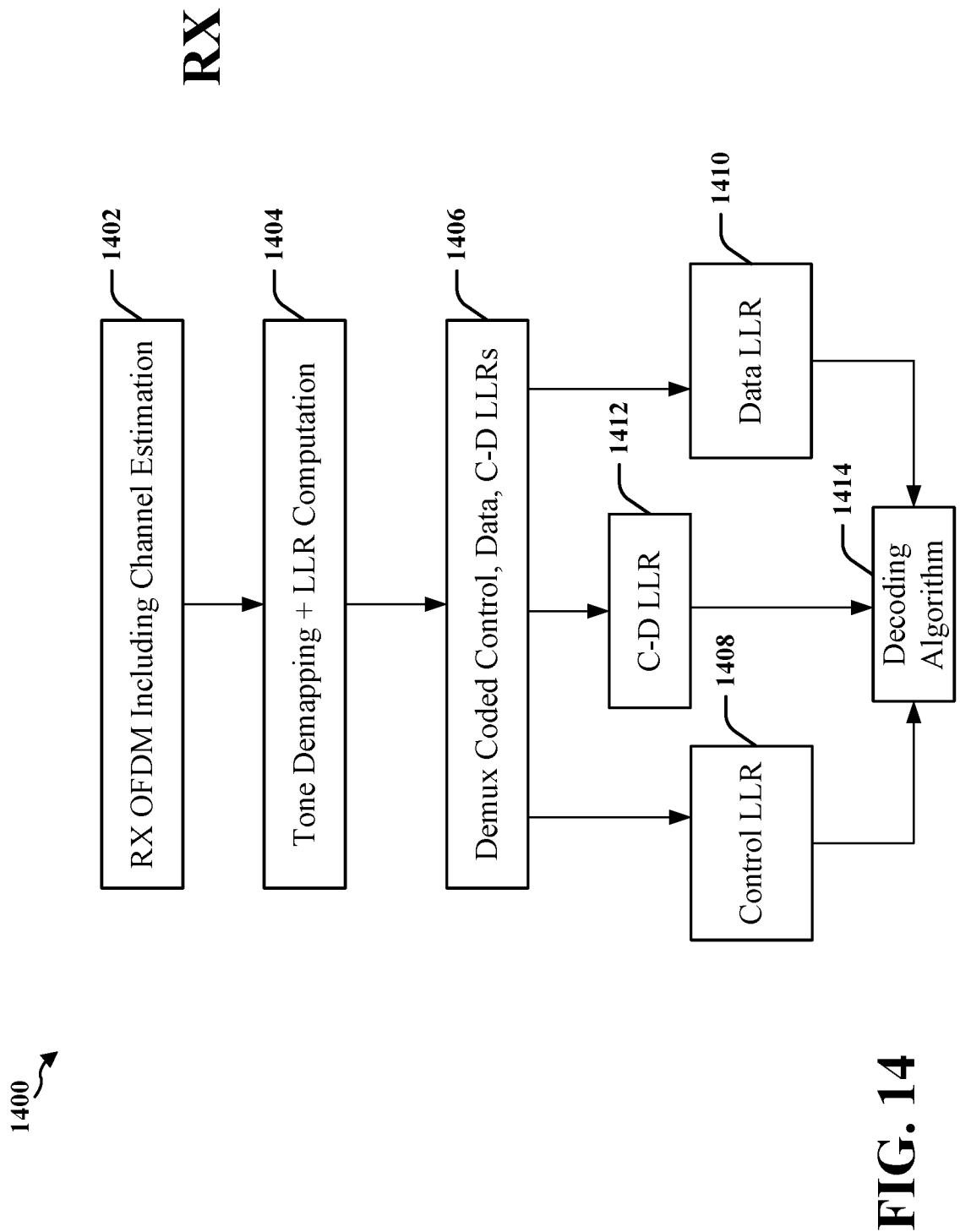
FIG. 14 is a diagram illustrating an in-band control information reception and decoding method in accordance with an aspect of the disclosure.
Figure 15:
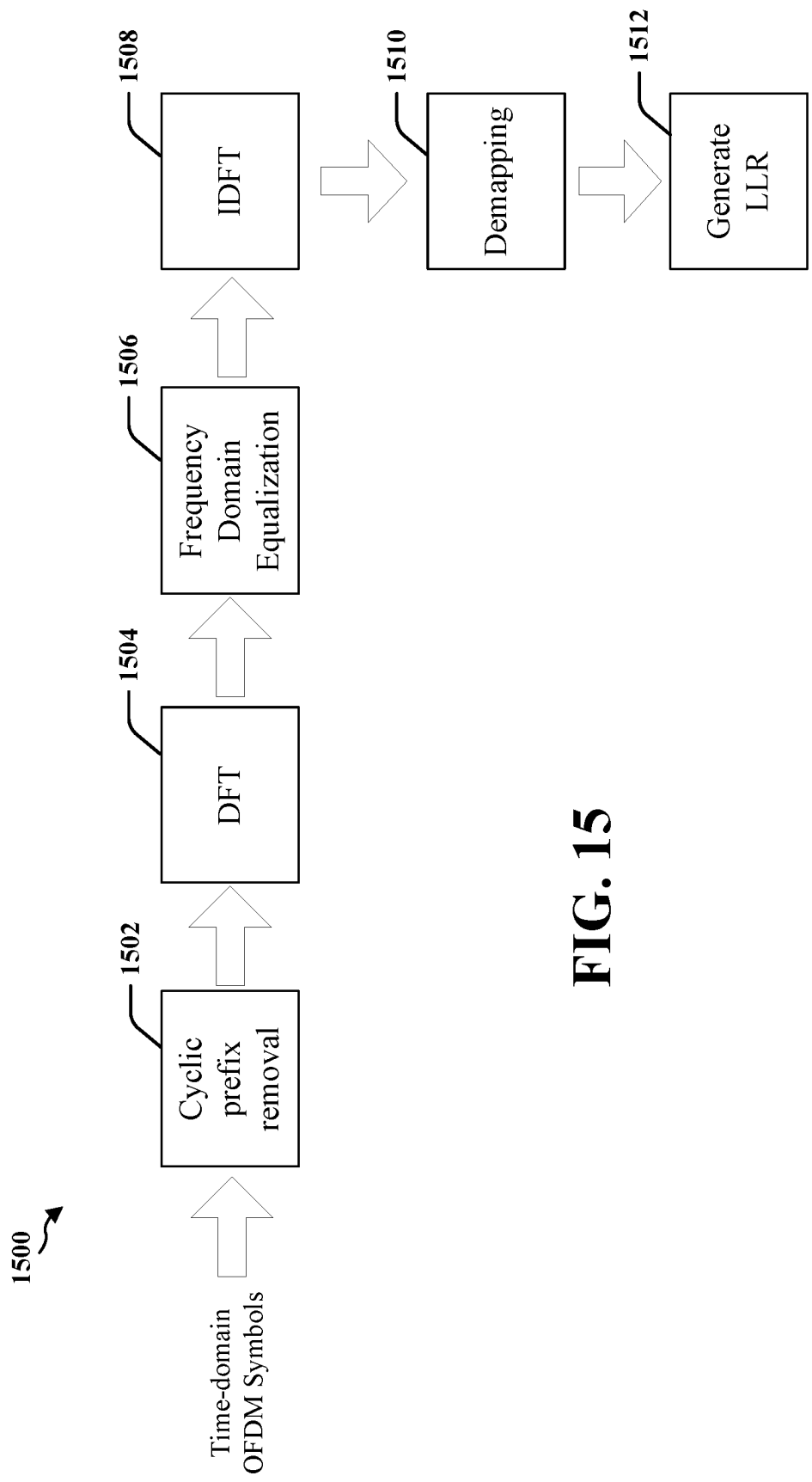
FIG. 15 is a diagram illustrating a process for converting time-domain orthogonal frequency division multiplexing (OFDM) symbols into single carrier symbols and generating log-likelihood ratios (LLRs) of coded bit, in accordance with an aspect of the disclosure.

The demultiplexing block 524 may be configured to demultiplex combined LLRs into multiple separate LLRs. For example, the combined LLRs may be separated into coded control information LLR, coded data information LLR, and coded control-data information LLR as shown in FIG. 14. The in-band control information decoding block 526 may be configured to perform an in-band control decoding algorithm (e.g., algorithm 1600 illustrated in FIG. 16) to decode coded control information and coded data information received from a subordinate entity 600.

The processor 504 is responsible for managing the bus 502 and general processing, including the execution of software stored on the computer-readable medium 506. The software, when executed by the processor 504, causes the processing system 514 to perform the various functions described below in relation to FIGS. 14-16 and 18 for any particular apparatus. The computer-readable medium 506 may also be used for storing data that is manipulated by the processor 504 when executing software.

In one aspect of the disclosure, the software includes computer executable code or instructions for configuring the processor 504 and/or the apparatus 500 to perform the various functions. For example, the software may include in-band control decoding code 538 when executed configures the processor 504 to perform the in-band control decoding method described in relation to FIGS. 14-16 and 18.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 6:
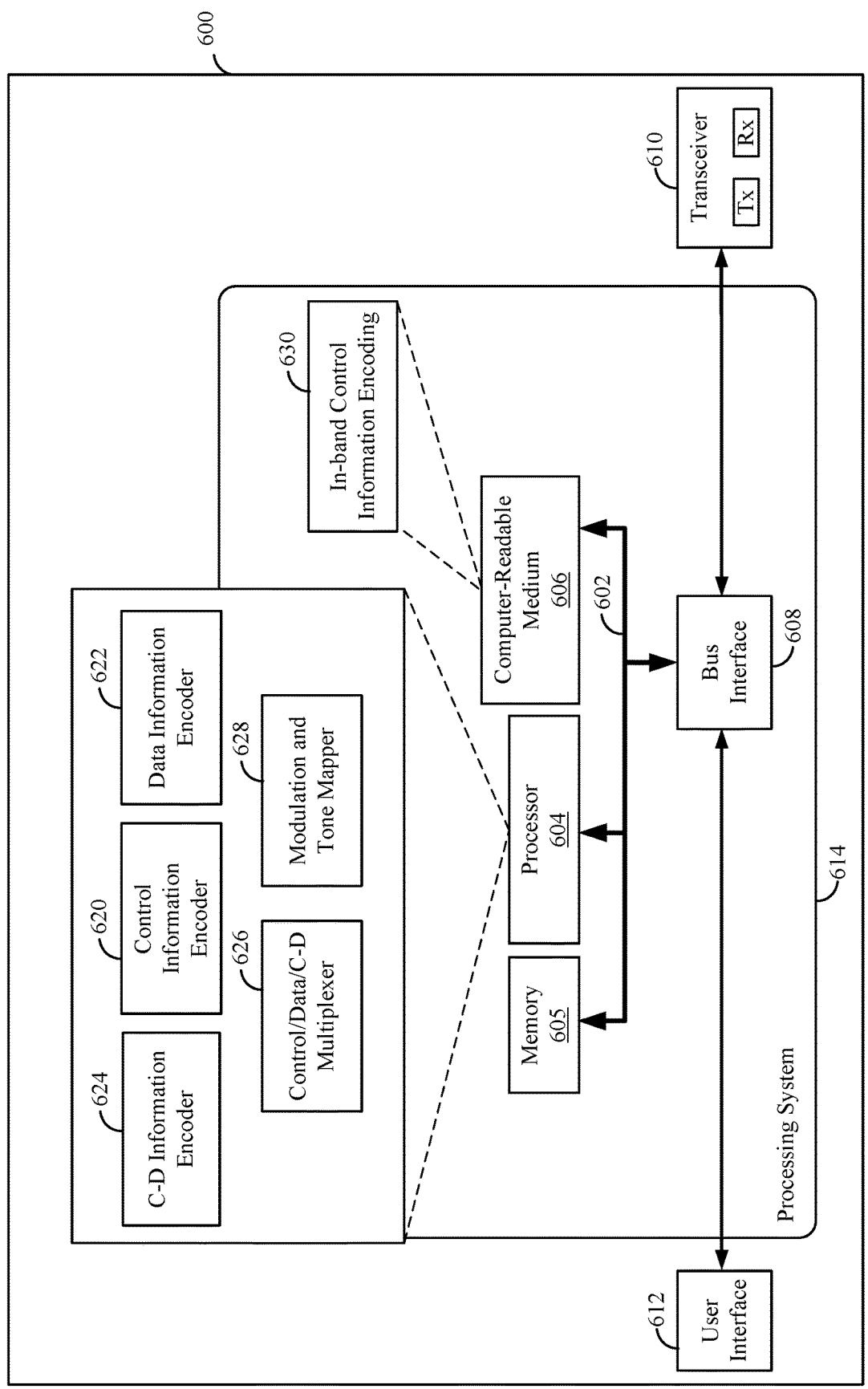
FIG. 6 is a diagram illustrating an example of a hardware implementation for a subordinate entity in accordance with an aspect of the disclosure.

FIG. 6 is a conceptual diagram illustrating an example of a hardware implementation for a subordinate entity 600 employing a processing system 614. In accordance with various aspects of the disclosure, an element, or any portion of an element, or any combination of elements may be implemented with a processing system 614 that includes one or more processors 604. For example, the subordinate entity 600 may be any of the subordinate entities, UEs, or any other suitable network node, as illustrated in FIGS. 1, 2, and/or 7. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 604, as utilized in a subordinate entity 600, may be used to implement any one or more of the processes described in FIGS. 8-12 and 17 of the present disclosure.

In this example, the processing system 614 may be implemented with a bus architecture, represented generally by the bus 602. The bus 602 may include any number of interconnecting buses and bridges depending on the specific application of the processing system 614 and the overall design constraints. The bus 602 links together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits, which are well known in the art, and therefore, will not be described any further. A bus interface 608 provides an interface between the bus 602 and one or more transceivers 610. The transceiver 610 provides a communication interface or means for communicating with various other apparatus over a transmission medium. In various examples, the transceiver 610 may include one or more antennas, and in multi-antenna examples, may be enabled to determine an angle from which a received signal arrives, or for beamforming of transmitted signals. The transceiver 610 may include various sub-components configured to enable wireless communication, including but not limited to one or more power amplifiers, a transmitter, a receiver, filters, oscillators, etc. Further, depending upon the nature of the apparatus, a user interface 612 (e.g., keypad, display, speaker, microphone, joystick, etc.) may also be provided.

In one aspect of the disclosure, the processor 604 includes a control information encoder 620, a data information encoder 622, a control-data information encoder 624, a multiplexer 626, a modulation and tone mapping block 628. The control information encoder 620 may be configured to encode control information to generated coded control information (e.g., coded control information 906 of FIG. 9), for example, using a convolutional code structure, a turbo code structure, a low-density parity-check (LDPC) code structure, a polar code structure, or any suitable code structure. The data information encoder 622 may be configured to encode data information to generate coded data information (e.g., coded data information 912 of FIG. 9), for example, using a Turbo code structure or any suitable code structure. The control-data information encoder 624 may be configured to encode coded control information and coded data information to generate coded control-data information (e.g., coded C-D information 1008 of FIG. 10), for example, using convolutional coding, turbo coding, additional parity bits, or any suitable coding methods. The multiplexer 626 may be configured to multiplex the coded control information, coded data information, and coded C-D information, using any suitable multiplexing schemes (e.g., time multiplexing, frequency multiplexing). The modulation and tone mapping block 628 may be configured to modulate the multiplexed coded control information, coded data information, and coded C-D information, using a suitable modulation format, for example, OFDM modulation.

The processor 604 is responsible for managing the bus 602 and general processing, including the execution of software stored on the computer-readable medium 606. The software, when executed by the processor 604, causes the processing system 614 to perform the various functions described below for any particular apparatus. The computer-readable medium 606 may also be used for storing data that is manipulated by the processor 604 when executing software.

In one aspect of the disclosure, the software includes computer executable code or instructions for configuring the processor 604 and/or the apparatus 600 to perform the various functions described in FIGS. 8-12 and 18. For example, the software may include in-band control information code 630 when executed configures the processor to perform an in-band control information encoding and transmission method for reducing the BLER of the in-band control information.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606. The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

FIG. 7 is a block diagram of a scheduling entity 710 in communication with a subordinate entity 750 in an access network as they may appear according to some aspects of the present disclosure. Here, the scheduling entity 710 may be the same as the scheduling entity 202 illustrated in FIG. 2, and/or the scheduling entity 500 illustrated in FIG. 5. Further, the subordinate entity 750 may be the same as the subordinate entity 204 illustrated in FIG. 4, and/or the subordinate entity 600 illustrated in FIG. 6.

In the DL, upper layer packets (e.g., user date or control information) from the core network are provided to a controller/processor 775. The controller/processor 775 implements L2 layer functionality. In the DL, the controller/processor 775 may provide header compression, ciphering, packet segmentation and reordering, multiplexing between logical and transport channels, and radio resource allocations to the subordinate entity 750 based on various priority metrics. The controller/processor 775 is also responsible for HARQ operations, retransmission of lost packets, and signaling to the subordinate entity 750.

The TX processor 716 implements various signal processing functions for the L1 layer (i.e., physical layer). The signal processing functions includes coding and interleaving to facilitate forward error correction (FEC) at the subordinate entity 750 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by the subordinate entity 750. Each spatial stream is then provided to a different antenna 720 via a separate transmitter 718TX. Each transmitter 718TX modulates an RF carrier with a respective spatial stream for transmission via one or more wireless communication channels.

At the subordinate entity 750, each receiver 754RX receives a signal through its respective antenna 752. Each receiver 754RX recovers information modulated onto an RF carrier and provides the information to the receiver (RX) processor 756.

The RX processor 756 implements various signal processing functions of the L1 layer. The RX processor 756 performs spatial processing on the information to recover any spatial streams destined for the subordinate entity 750. If multiple spatial streams are destined for the subordinate entity 750, they may be combined by the RX processor 756 into a single OFDM symbol stream. The RX processor 756 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the scheduling entity 710. These soft decisions may be based on channel estimates computed by the channel estimator 758. The soft decisions are then decoded and deinterleaved to recover the data and control signals that were originally transmitted by the scheduling entity 710 on the physical channel. The data and control signals are then provided to the controller/processor 759.

The controller/processor 759 implements the L2 layer functions. In the DL, the control/processor 759 provides demultiplexing between transport and logical channels, packet reassembly, deciphering, header decompression, control signal processing to recover upper layer packets from the core network. The upper layer packets are then provided to a data sink 762, which represents all the protocol layers above the L2 layer. Various control signals may also be provided to the data sink 762 for L3 processing. The controller/processor 759 is also responsible for error detection using an acknowledgement (ACK) and/or negative acknowledgement (NACK) protocol to support HARQ operations.

In the UL, a data source 767 is used to provide upper layer packets to the controller/processor 759. The data source 767 represents all protocol layers above the L2 layer (L2). Similar to the functionality described in connection with the DL transmission by the scheduling entity 710, the controller/processor 759 implements the L2 layer for the user plane and the control plane by providing header compression, ciphering, packet segmentation and reordering, and multiplexing between logical and transport channels based on radio resource allocations by the scheduling entity 710. The controller/processor 759 is also responsible for HARQ operations, retransmission of lost packets, and signaling to the scheduling entity 710.

Channel estimates derived by a channel estimator 758 from a reference signal or feedback transmitted by the scheduling entity 710 may be used by the TX processor 768 to select the appropriate coding and modulation schemes, and to facilitate spatial processing. The spatial streams generated by the TX processor 768 are provided to different antenna 752 via separate transmitters 754TX. Each transmitter 754TX modulates an RF carrier with a respective spatial stream for transmission.

The UL transmission is processed at the scheduling entity 710 in a manner similar to that described in connection with the receiver function at the subordinate entity 750. Each receiver 718RX receives a signal through its respective antenna 720. Each receiver 718RX recovers information modulated onto an RF carrier and provides the information to an RX processor 770. The RX processor 770 implements the L1 layer.

In the UL, the controller/processor 775 provides demultiplexing between transport and logical channels, packet reassembly, deciphering, header decompression, control signal processing to recover upper layer packets from the subordinate entity 750. Upper layer packets from the controller/processor 775 may be provided to the core network. The controller/processor 475 is also responsible for error detection using an ACK and/or NACK protocol to support HARQ operations.

Figure 8:
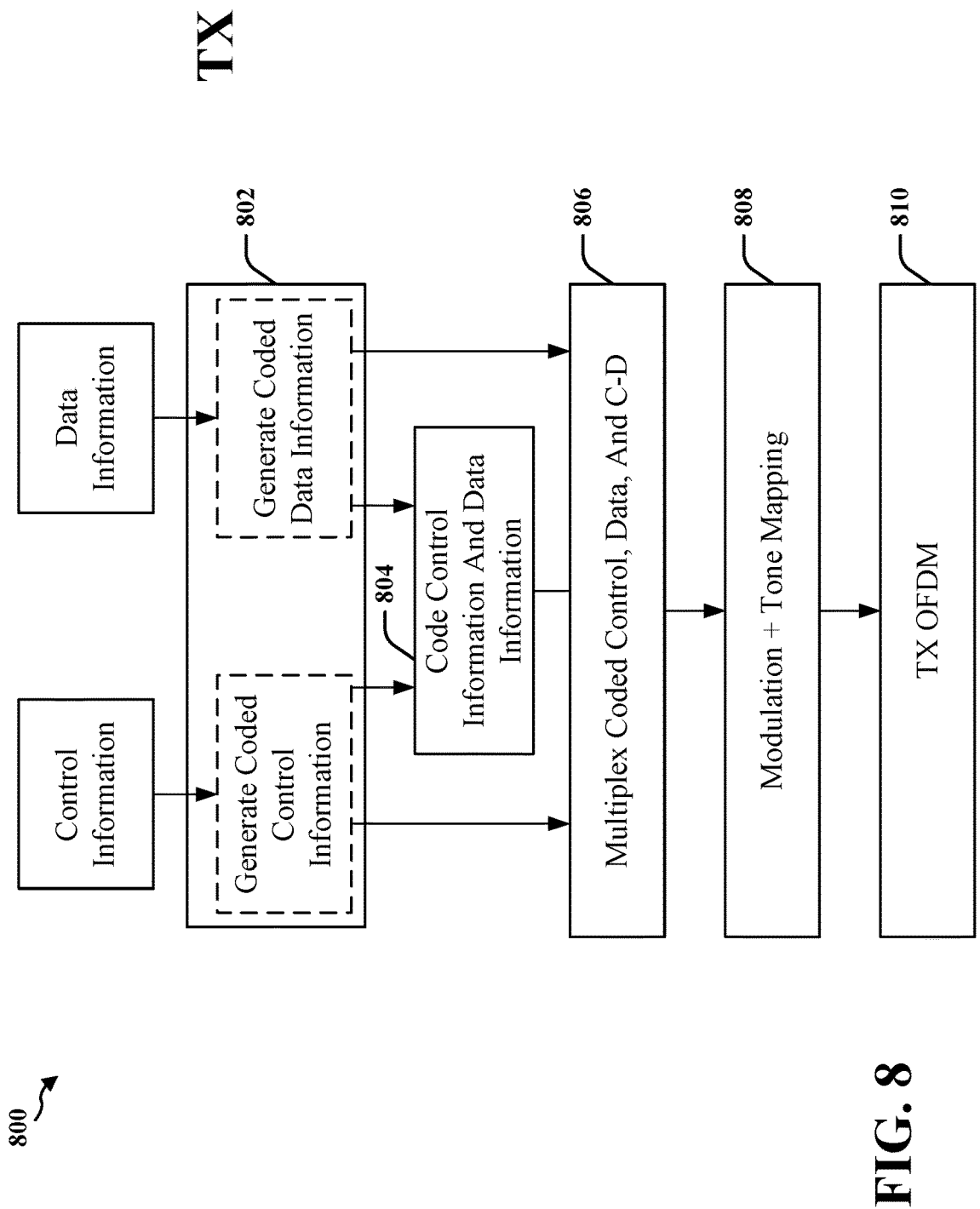
FIG. 8 is a diagram illustrating an in-band control information coding and transmission method in accordance with an aspect of the disclosure.
Figure 9:
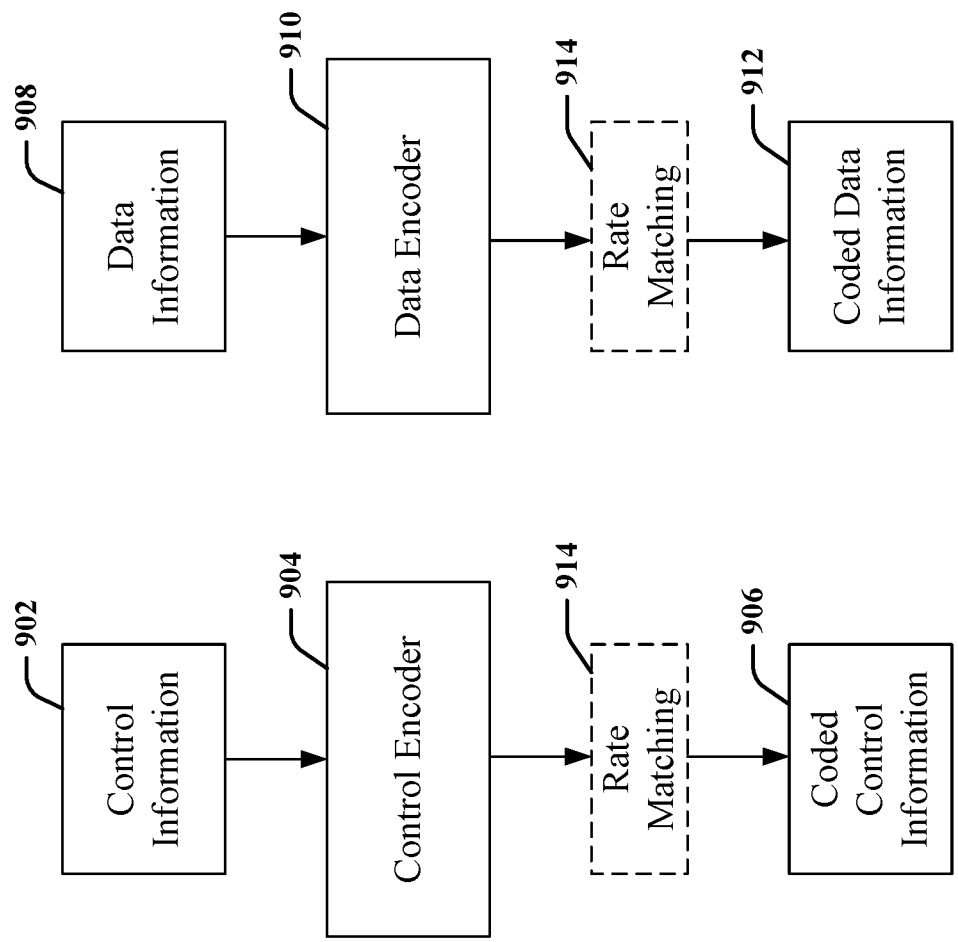
FIG. 9 is a diagram illustrating a control information encoding method and data information encoding method, in accordance with an aspect of the disclosure.
Figure 10:
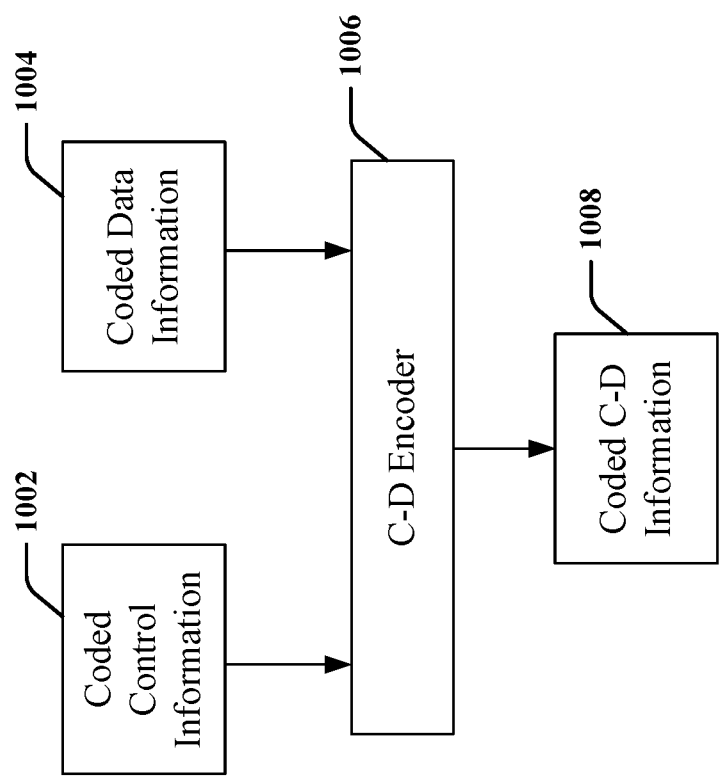
FIG. 10 is a diagram illustrating a method for generating coded control-data (C-D) information using both coded control information and coded data information, in accordance with an aspect of the disclosure.
Figure 11:
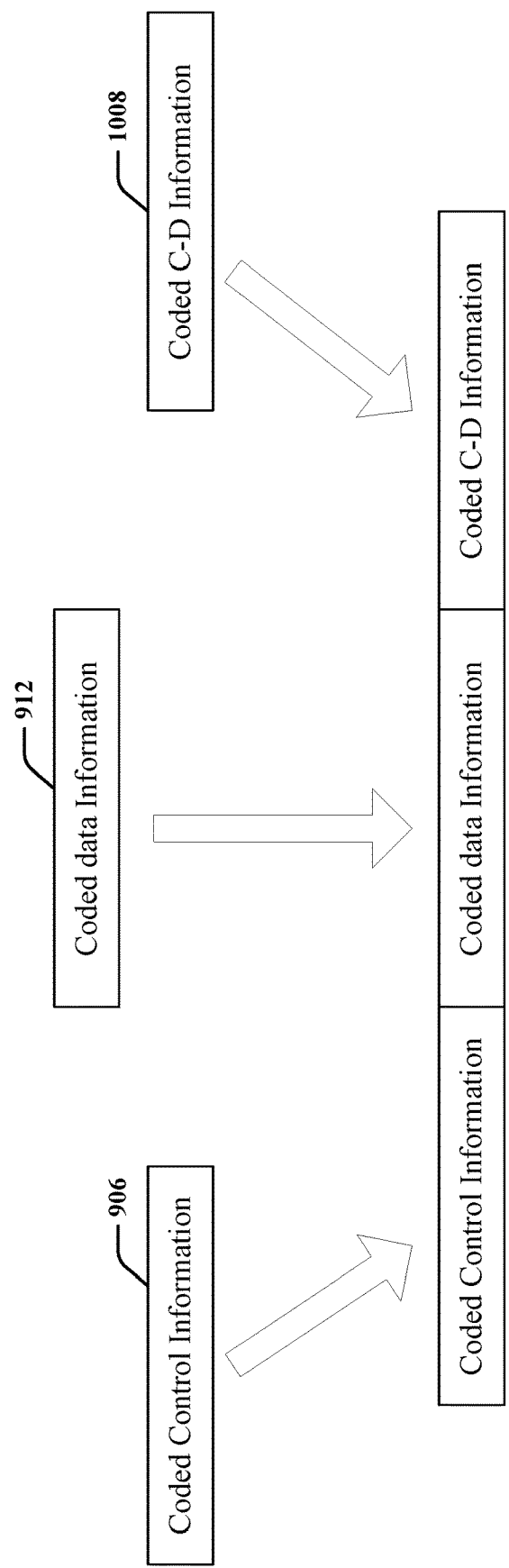
FIG. 11 is a diagram illustrating a concatenation of coded control information, coded data information, and coded C-D information, in accordance with an aspect of the disclosure.

FIG. 8 is a diagram illustrating an in-band control information coding and transmission method 800 for reducing the BLER of the in-band control information in accordance with an aspect of the disclosure. The method 800 may be performed by any of the subordinate entities or UEs illustrated in FIGS. 1, 2, 6, and/or 7, or any other suitable communication device. In one example, a subordinate entity 600 of FIG. 6 may be configured to perform the coding and transmission method 800 to transmit in-band control information and data information coded together on an uplink channel to a scheduling entity. In one example, the uplink channel may be a PUSCH. Data information may include user information or payload data.

At block 802, control information and data information are coded or encoded separately. For example, the control information may be any of the uplink control information (UCI) of a PUSCH. Some non-limiting UCI examples are a scheduling request (SR), an acknowledgement/non-acknowledgement (ACK/NACK) signal for hybrid automatic retransmission request (HARQ), a channel quality indicator (CQI), a precoding matrix indicator (PMI), a rank indicator (RI), etc. The data information may be user data/payload or information such as voice and/or data communication for various services. The subordinate entity may utilize a processor 604 and/or separate processors to encode the control information and data information separately. For example, the subordinate entity may utilize a control information encoder 620 configured to encode the control information, and a data information encoder 622 configured to encode the data information. The separate encoding of the control information and data information allows different codes or code structures to be used if desired for coding the control information and data information.

According to various aspects of the present disclosure, any suitable coding structures may be utilized for encoding the control information and the data information. In one aspect of the disclosure, the same coding structure may be utilized for encoding the control information and the data information. In another aspect of the disclosure, different coding structures may be utilized for encoding the control information and the data information, separately. In one example illustrated in FIG. 9, control information 902 may be encoded at a control information encoder 904 using a convolutional code or code structure to generate coded control information 906. Data information 908 may be encoded at a data information encoder 910 using a turbo code or code structure to generate coded data information 912. The control information encoder 904 and data information encoder 910 may be the same as those included in the processor 604 of FIG. 6. In some examples, as indicated above, polar codes, low-density parity-check (LDPC) codes, and convolutional-LDPC codes may be used to encode the control and/or data information.

In one example, if the data information is a HARQ retransmission, the same code structure of the previous data transmission may be used for coding the HARQ retransmission, while a different code structure may be used for encoding the control information (if available). In some examples, the coded information or bits may optionally be rate-matched 914 to a predetermined number of bits to generate the desired code blocks.

Referring back to FIG. 8, at block 804, the subordinate entity may utilize the C-D information encoder 624 configured to encode the coded control information and coded data information together (or at least a portion of each) to generate coded control-data (C-D) information. In one example illustrated in FIG. 10, coded control information 1002 and coded data information 1004 are encoded together or mix-coded by a C-D encoder 1006 to generate coded C-D information 1008 (coded C-D). The data information 1004 may be initial transmissions of data or HARQ retransmissions of the data.

The C-D encoder 1006 may be the same as the C-D information encoder 624 of FIG. 6. Here, encoding the coded control information and coded data information together may use any of the coding structures described above, such as convolutional coding, turbo coding, etc. applied to the coded control information and the coded data information, together.

In some examples, encoding the mix-coded control information and coded data information together may refer to a more simplified combination of the coded control information and coded data information, such as the application of an exclusive-OR operation to at least some of the coded control information (or bits) and at least some of the coded data information (or bits), such that the coded control-data (C-D) information may include one or more parity bits generated from the coded control information and coded data information. In other examples, any suitable methods may be used by the C-D encoder 1006 to generate the coded control-data information 1008.

In some examples, one or more parity bits may be added to the coded data information (bits) and/or coded control information (bits) for the purpose of detecting errors when the coded data information and/or coded control information is transmitted.

Referring back to FIG. 8, at block 806, the subordinate entity may utilize a data multiplexer 626 (see FIG. 6) to multiplex the coded control information, coded data information, and coded C-D information. For example, the coded control information, coded data information, and coded C-D information may be multiplexed using time division multiplexing, frequency division multiplexing, or any suitable multiplexing scheme. In one example illustrated in FIG. 11, the multiplexing may be done by concatenating the coded control information 906, the coded data information 912, and the coded control-data information 1008 in any suitable order. Then the process may proceed to block 808.

Figure 12:
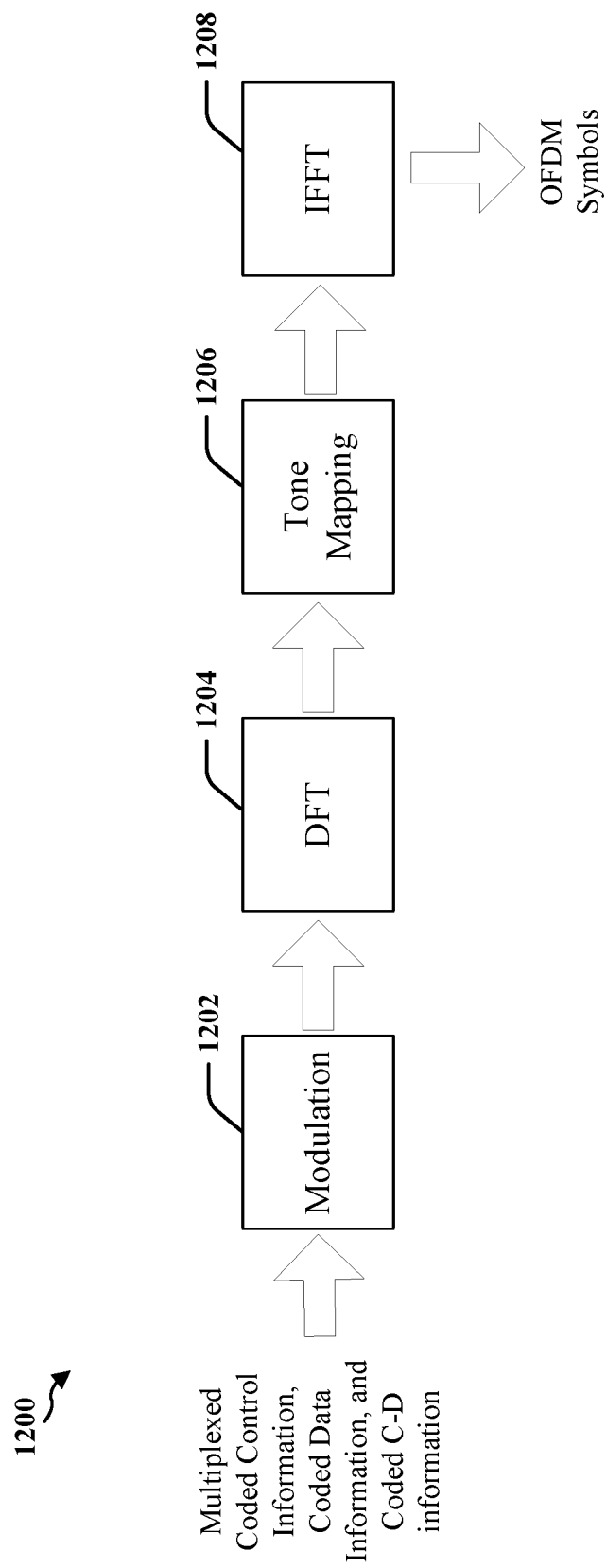
FIG. 12 is a diagram illustrating a process for modulating and tone-mapping multiplexed coded control information, coded data information, and coded C-D information, in accordance with an aspect of the disclosure.

At block 808, the subordinate entity may utilize a modulation and tone mapping block 628 to modulate the multiplexed coded control information, coded data information, and coded C-D information, using a suitable modulation format. Then, the modulated tones are mapped to one or more carriers for transmission. FIG. 12 is a diagram illustrating a process 1200 for modulating and tone-mapping the multiplexed coded control information, coded data information, and coded C-D information, in accordance with an aspect of the disclosure. At block 1202, multiplexed coded control information, coded data information, and coded C-D may be modulated using for example QPSK, 16QAM, or 64QAM, or any suitable modulation scheme. At block 1204, the subordinate entity transforms the modulated time domain symbols to the frequency domain (frequency domain points), for example by performing a DFT (discrete Fourier transform) operation on the time domain symbols. Then, at block 1206, the frequency domain points (e.g., tones) are mapped (toning mapping) onto the subcarriers assigned to the subordinate entity.

Referring back to FIG. 8, at block 810, the subordinate entity may utilize the transceiver 610 (e.g., TX processor 468 and transmitter 454TX) to transmit the time domain OFDM symbols to a scheduling entity (e.g., a base station or eNode B). For example, the subordinate entity may perform an IFFT (inverse fast Fourier transform) operation (e.g., at the IFFT block 1208 of FIG. 12) to convert the frequency domain OFDM symbols to time domain OFDM symbols, and the resulting time domain OFDM symbols are transmitted to the scheduling entity. While the various blocks and functions of the in-band control information coding and transmission method 800 are illustrated in a particular order, these blocks and functions may be implemented in different orders or sequences in other designs and implementations.

Figure 13:
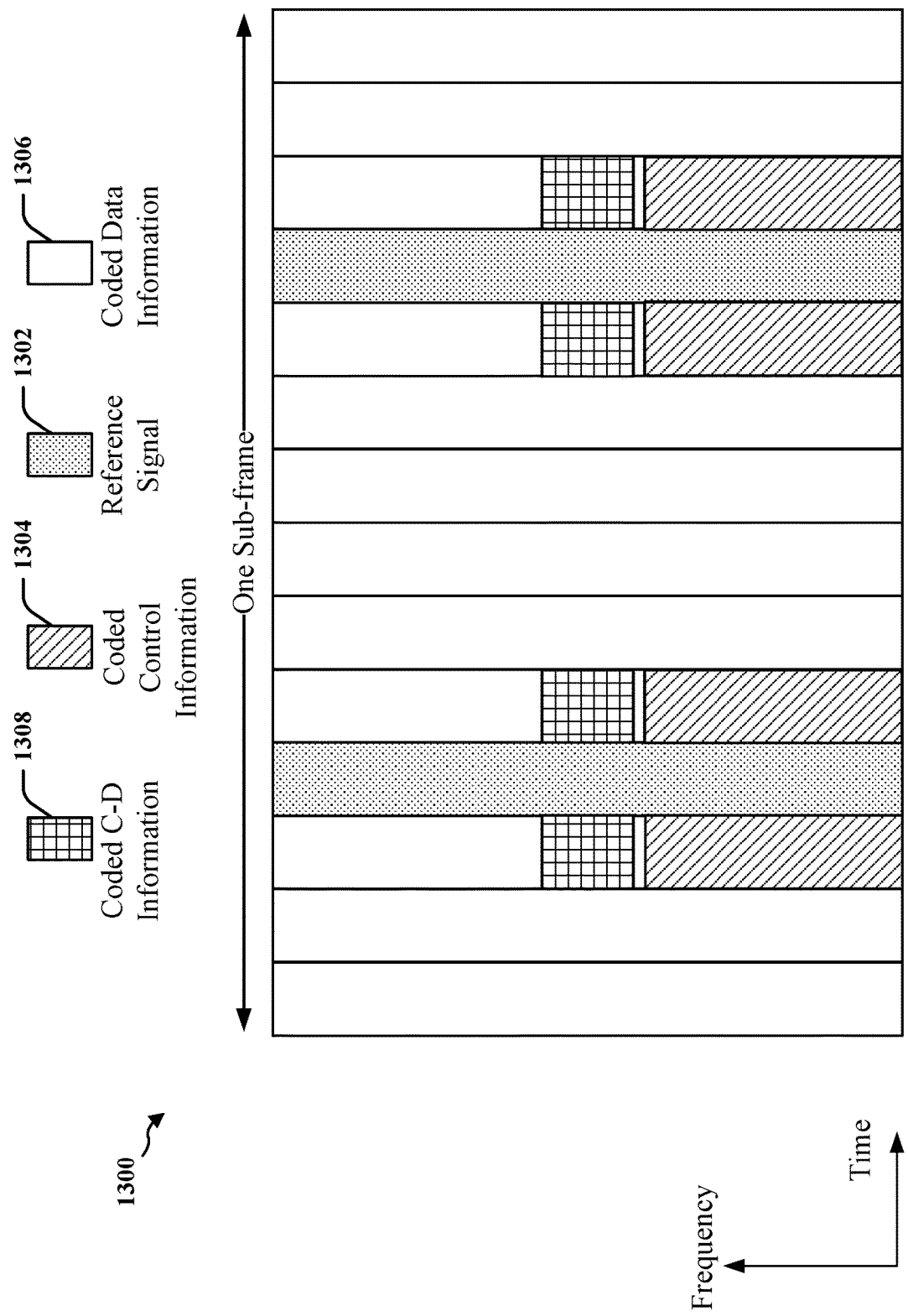
FIG. 13 is a diagram illustrating an example of a sub-frame containing in-band control information, control information, and data information for an uplink channel in accordance with an aspect of the disclosure.

FIG. 13 is a diagram illustrating an example of a sub-frame 1300 containing in-band control information for an uplink channel in accordance with an aspect of the disclosure. In one example, the sub-frame 1300 may include coded control information, coded data information, and coded control-data information that are coded and modulated according to the in-band control information coding and transmission method 800 as described above in reference to FIG. 8. In FIG. 13, a reference signal 1302 may be transmitted twice in one sub-frame. Some examples of the reference signal 1302 are a demodulation reference signal (DM-RS) and a sounding reference signal (SRS). The symbols of coded control information 1304, coded data information 1306, and coded control-data (C-D) information 1308 are assigned to their corresponding frequency and time slots. In one example, the coded control-data information 1308 may include one or more parity bits generated from the coded control information 1304 and coded data information 1306 as described above in reference to FIG. 8.

In one example, the coded in-band control information 1304 may contain the UCI over a PUSCH subframe 1300. The UCI may include one or more of a scheduling request, an ACK/NACK signal for HARQ, CQI, PMI, RI, etc. The PUSCH subframe 1300 carries coded control information 1304, coded data information 1306, and coded C-D information 1308 for reducing the BLER of the in-band control information.

FIG. 14 is a diagram illustrating an in-band control information reception and decoding method 1400 in accordance with an aspect of the disclosure. The reception and decoding method 1400 may be performed by any of the scheduling entities, base stations or eNode Bs illustrated in FIGS. 1, 2, 5, and/or 7. In one example, a scheduling entity 500 (e.g., FIG. 5) may be configured to perform the in-band control information reception and decoding method 1400 to decode an UL transmission received from a subordinate entity 600 (e.g., FIG. 6). For example, the UL transmission may be the same as the UL transmission described in FIGS. 8-13.

At block 1402, a scheduling entity 500 may utilize a transceiver 510 to receive a number of OFDM symbols transmitted from a subordinate entity. The OFDM symbols may contain coded control information, coded data information, and coded control-data information as described above in relation to FIGS. 8-13. The scheduling entity 500 may determine channel estimation based on one or more reference signals in the UL transmission. Some examples of reference signal include the DM-RS and SRS. The reference signal DM-RS can facilitate demodulation of the PUSCH or PUCCH. The reference signal SRS may be used to facilitate frequency dependent scheduling and is not associated with transmission of PUSCH or PUCCH.

At block 1404, the scheduling entity may utilize a demodulation block 522 (see FIG. 5) to perform a number of operations to convert the received time-domain OFDM symbols into single carrier symbols. In an example illustrated in FIG. 15, these operations may include one or more of cyclic prefix removal 1502, discrete Fourier transform (DFT) 1504, frequency domain equalization 1506, and inverse discrete Fourier transform (IDFT) 1508. Then the scheduling entity de-maps 1510 (tone de-mapping) the symbols and generates a log-likelihood ratio (LLR) 1512 of each coded bit. The LLR is the natural logarithm of the ratio of the probability that a bit was a "1" over the probability that the bit was a zero. The LLR may be called a soft bit. The larger the LLR value, the more likely the bit is a "1", and the smaller the LLR value, the more likely the bit is a "0".

Referring back to FIG. 14, at block 1406, the scheduling entity may utilize a demultiplexer 524 to demultiplex or separate the still combined LLRs into separate coded control information LLRs, coded data information LLRs, and coded control-data information LLRs. For example, the scheduling entity generates one or more control LLRs 1408 of the coded control information, one or more data LLRs 1410 for the coded data information, and one or more control-data (C-D) LLRs 1412 for the coded control-data information. In one example, the C-D LLRs 1412 may correspond to the coded C-D information in block 804 of FIG. 8. In one specific example, the C-D LLRs 1412 correspond to one or more parity bits generated from coded control information and coded data information. Using these LLRs, the scheduling entity may decode the coded control information, coded data information, and coded control-data information, respectively, using a decoding algorithm 1414. An example of the decoding algorithm is illustrated in FIG. 16.

Figure 16:
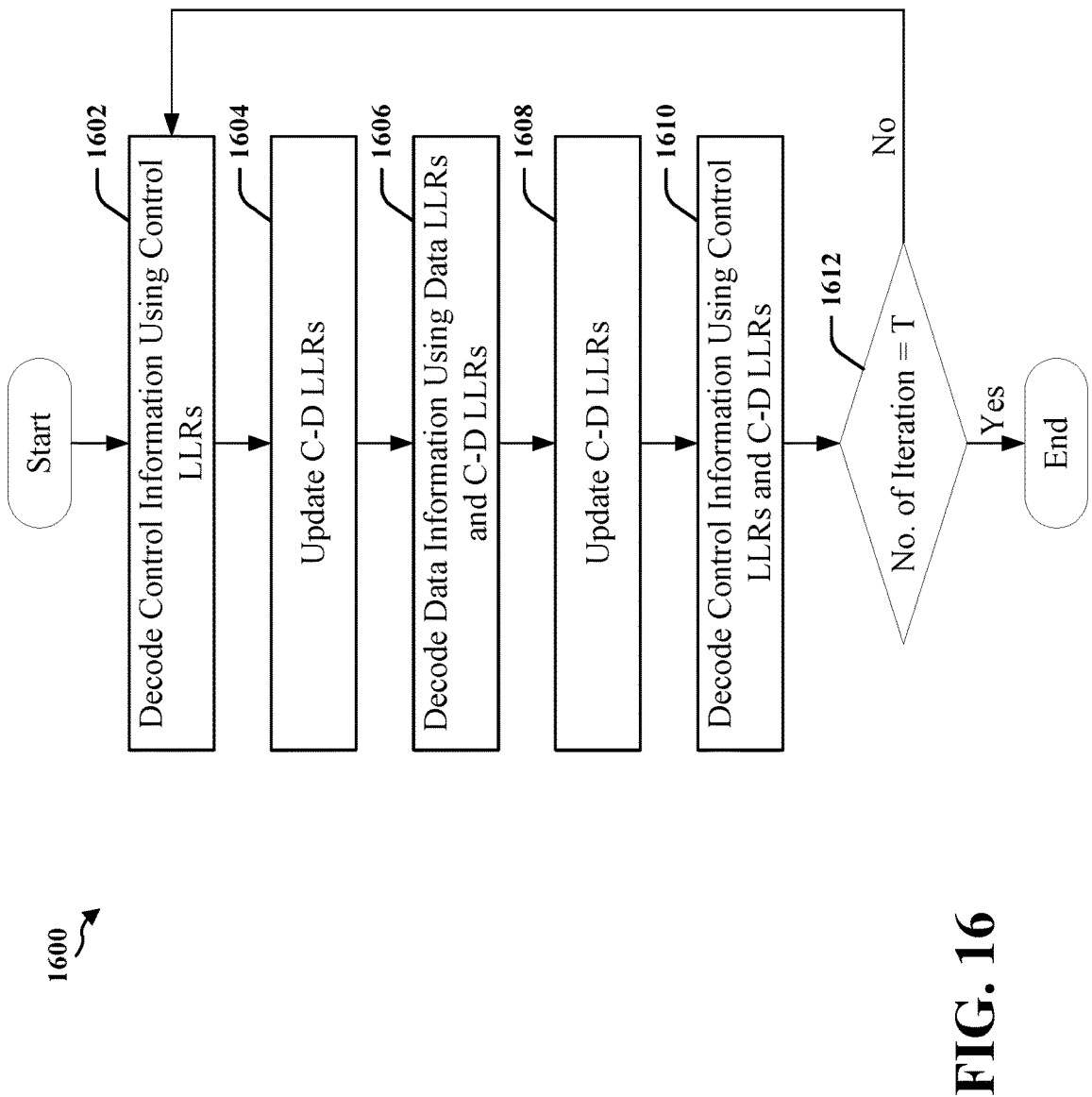
FIG. 16 is a diagram illustrating an in-band control information decoding algorithm in accordance with an aspect of the disclosure.

FIG. 16 is a diagram illustrating an in-band control information decoding algorithm 1600 in accordance with an aspect of the disclosure. The decoding algorithm 1600 may be performed by any of the scheduling entities, base stations, or eNode Bs illustrated in FIGS. 1, 2, 5, and/or 6. In one example, a scheduling entity may utilize an in-band control information decoder 526 (FIG. 5) to perform the decoding algorithm 1414 of FIG. 14.

At block 1602, a scheduling entity may decode coded control information using control LLRs. In one example, the control LLRs may be the same as the control LLRs 1408 of FIG. 14. At block 1604, the scheduling entity may update C-D LLRs based on the decoded control information. In one example, the C-D LLRs may be the same as the C-D LLRs 1412 of FIG. 14. Updating the LLRs may improve the decoding results using such LLRs. That is, the decoding will have less errors or a lower BLER. The LLRs are updated to account for the coding operation performed in block 804 (FIG. 8). For example, when a simple exclusive-OR operation is used, the sum-product rule may be used to update the C-D LLRs using the decoded control information.

At block 1606, the scheduling entity may decode the data information using both data LLRs and the C-D LLRs. In one example, the data LLRs may be the same as the data LLRs 1410 of FIG. 14. At block 1608, the scheduling entity may update the C-D LLRs based on the decoded data information. The LLRs are updated to account for the coding operation performed in block 804. For example, when a simple exclusive-OR operation is used, the sum-product rule may be used to update C-D LLRs using the decoded data information. At block 1610, the scheduling entity may decode the control information using the updated control LLRs and updated C-D LLRs.

The above described process may be performed for a predetermined number of iterations. At decision block 1612, the scheduling entity determines whether or not the decoding process has been performed for a predetermined number of iterations. In some examples, the number of iterations may be 2 or 3, or any suitable number such that the desired decoding error rate (e.g., bit error rate or block error rate) can be achieved.

Figure 17:
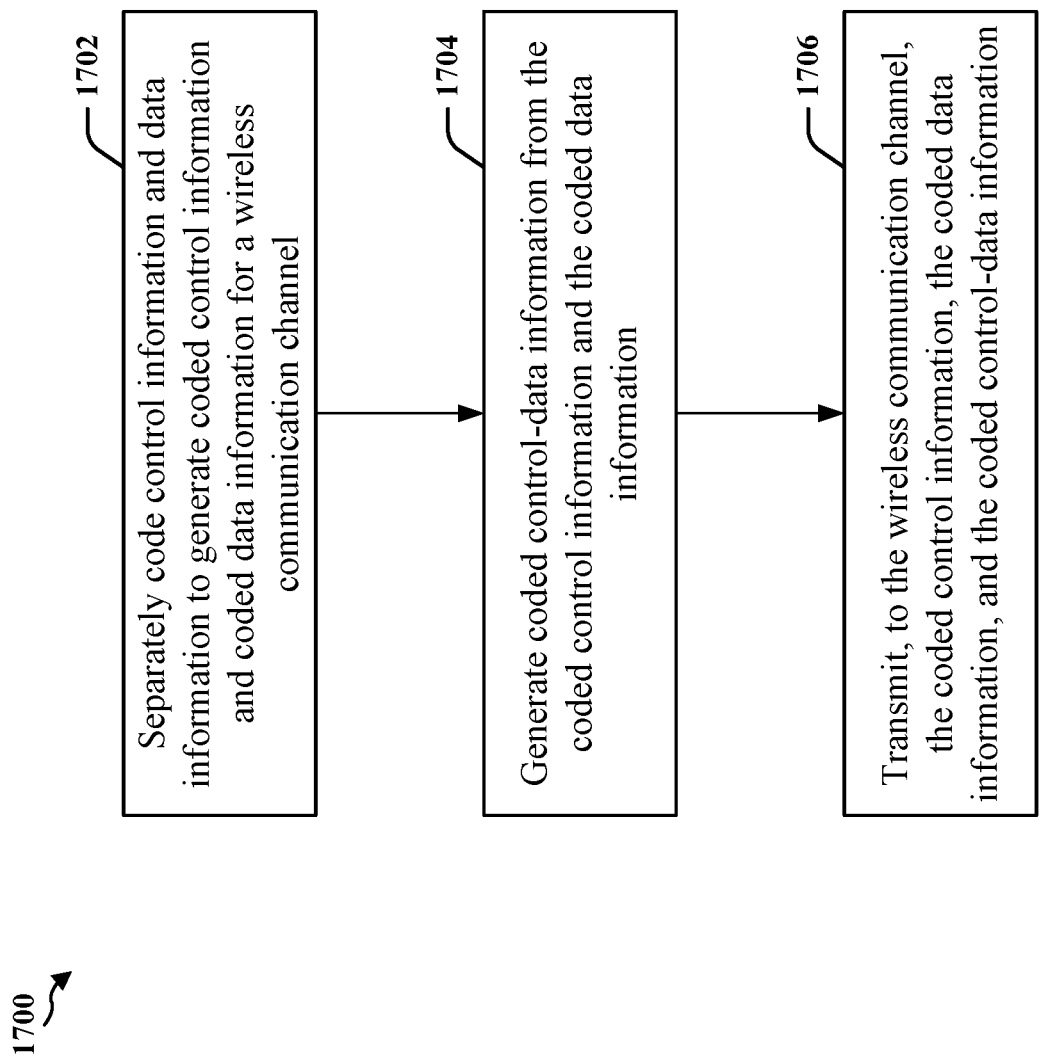
FIG. 17 is a flowchart illustrating an in-band control information transmission method in a wireless communication network, in accordance with an aspect of the disclosure.

FIG. 17 is a flowchart illustrating an in-band control information transmission method 1700 in a wireless communication network, in accordance with an aspect of the disclosure. The method 1700 may be performed by a subordinate entity illustrated in any of FIGS. 1, 2, 6, and/or 7, or any communication device. At block 1702, a subordinate entity may separately encode control information and data information to generate coded control information and coded data information for a wireless communication channel. For example, the subordinate entity may utilize a control information encoder 620 (see FIG. 6) to encode the control information, and a data information encoder 622 (see FIG. 6) to encode the data information. In one example, the control information encoder may be the same as the control information encoder 904 of FIG. 9, and the data information encoder may be the same as the data information encoder 910 of FIG. 9.

At block 1704, the subordinate entity may generate coded control-data information from the coded control information and the coded data information. For example, the subordinate entity may utilize a C-D information encoder 624 (see FIG. 6) to generate the coded control-data information as described in relation to FIGS. 8, 10, and/or 11. At block 1706, the subordinate entity may transmit, to the wireless communication channel, the coded control information, the coded data information, and the coded control-data information. For example, the subordinate entity may utilize the multiplexer 626, modulation and tone mapping block 628, and/or transceivers 610 to transmit the information as described in relation to FIG. 12.

FIG. 18 is a flowchart illustrating a method 1800 of receiving in-band control information in a wireless communication network, in accordance with an aspect of the disclosure. The method 1800 may be performed by a scheduling entity illustrated in any of FIGS. 1, 2, 5, and/or 7. At block 1802, a scheduling entity receives and demodulates a transmission via a wireless communication channel. The transmission includes coded control information, coded data information, and coded control-data information corresponding to the coded control information and the coded data information. For example, the scheduling entity may utilize a transceiver 510 (see FIG. 5) and a demodulation block 522 to receive and demodulate the transmission (e.g., subframe 1300 of FIG. 13) as described in relation to FIGS. 14-15.

At block 1804, the scheduling entity generates a plurality of first LLRs based on the coded control-data information. For example, the scheduling entity may utilize an LLR computation block 520 to generate the first LLRs as described in relation to FIGS. 14-15. At block 1806, the scheduling entity generates a plurality of second LLRs including a plurality of control LLRs and a plurality of data LLRs utilizing the plurality of first LLRs. For example, the scheduling entity may utilize the LLR computation block 520 to generate the second LLRs as described in relation to FIGS. 14-15.

At block 1808, the scheduling entity decodes the coded control information and the coded data information utilizing the plurality of first LLRs and second LLRs. For example, the scheduling entity may utilize the in-band control information decoding block 516 to decode the in-band control information as described in relation to FIG. 16.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of transmitting in-band control information in a wireless communication network, comprising:
    separately encoding control information and data information to generate coded control information and coded data information for a wireless communication channel;
    generating coded control-data information from the coded control information and the coded data information;
    multiplexing, using frequency division multiplexing, the coded control information, the coded data information, and the coded control-data information in a same symbol, prior to transmitting the coded control information, the coded data information, and the coded control-data information; and
    transmitting, to the wireless communication channel, the coded control information, the coded data information, and the coded control-data information.

2. The method of claim 1, wherein the generating coded control-data information comprises encoding the coded control information and the coded data information together.

3. The method of claim 1, wherein the generating the coded control-data information comprises:
    generating one or more parity bits from a combination of the coded control information and the coded data information.

4. The method of claim 1, wherein the separately encoding control information and data information comprises:
    encoding the control information utilizing a first code structure to generate the coded control information; and
    encoding the data information utilizing a second code structure different from the first code structure to generate the coded data information.

5. The method of claim 4,
    wherein the first code structure comprises a convolutional code structure; and
    wherein the second code structure comprises a Turbo code structure.

6. An apparatus for wireless communication comprising:
    a processor;
    a transceiver communicatively coupled to the processor; and
    a memory stored with executable code and communicatively coupled to the processor, wherein the processor is configured by the executable code to:
    separately encode control information and data information to generate coded control information and coded data information for a wireless communication channel;
    generate coded control-data information from the coded control information and the coded data information;
    multiplex, using frequency division multiplexing, the coded control information, the coded data information, and the coded control-data information in a same symbol, prior to transmitting the coded control information, the coded data information, and the coded control-data information; and
    transmit, to the wireless communication channel utilizing the transceiver, the coded control information, the coded data information, and the coded control-data information.

7. The apparatus of claim 6, wherein the processor is further configured to generate the coded control-data information by encoding the coded control information and the coded data information together.

8. The apparatus of claim 6, wherein the processor is further configured to generate the coded control-data information by generating one or more parity bits from a combination of the coded control information and the coded data information.

9. The apparatus of claim 6, wherein the processor is further configured to:
    encode the control information utilizing a first code structure to generate the coded control information; and
    encode the data information utilizing a second code structure different from the first code structure to generate the coded data information.

10. The apparatus of claim 9,
    wherein the first code structure comprises a convolutional code structure; and
    wherein the second code structure comprises a Turbo code structure.

11. The method of claim 1, wherein the multiplexing further comprises
    multiplexing the coded control information, the coded data information, and the coded control-data information using frequency division multiplexing.

12. The apparatus of claim 6, wherein the processor is further configured to:
    multiplex the coded control information, the coded data information, and the coded control-data information using frequency division multiplexing.

* * * * *